United States Patent [19]

McCombie

[11] Patent Number: 5,561,600
[45] Date of Patent: Oct. 1, 1996

[54] DUAL SENSOR MISFIRE DETECTION APPARATUS AND METHOD FOR AN INTERNAL COMBUSTION ENGINE

[75] Inventor: Jay C. McCombie, Rochester Hills, Mich.

[73] Assignee: Chrysler Corporation, Auburn, Mich.

[21] Appl. No.: 510,884

[22] Filed: Aug. 3, 1995

Related U.S. Application Data

[63] Continuation of Ser. No. 934,066, Aug. 21, 1992, abandoned.

[51] Int. Cl.⁶ .................................................. G01M 15/00
[52] U.S. Cl. .................... 364/431.08; 73/117.3; 123/419; 123/436
[58] Field of Search .................. 364/431.03, 431.04, 364/431.07, 431.08, 565; 123/418, 419, 425, 436; 73/116, 117.3

[56] References Cited

U.S. PATENT DOCUMENTS

| | | | |
|---|---|---|---|
| 4,179,922 | 12/1979 | Bouverie et al. | 73/116 |
| 4,197,767 | 4/1980 | Leung | 74/860 |
| 4,292,670 | 9/1981 | Reid et al. | 364/431.04 |
| 4,296,471 | 10/1981 | Goux | 364/565 X |
| 4,337,647 | 7/1982 | Radcliffe et al. | 73/116 |
| 4,461,257 | 7/1984 | Hosaka et al. | 123/419 |
| 4,532,592 | 7/1985 | Citron et al. | 364/431.05 |
| 4,562,818 | 1/1986 | Kohama et al. | 364/431.08 X |
| 4,606,224 | 8/1986 | Tedeschi et al. | 73/117.3 |
| 4,782,692 | 11/1988 | Peden et al. | 73/117.3 |
| 4,930,479 | 6/1990 | Osawa et al. | 123/436 |
| 4,932,379 | 6/1990 | Tang et al. | 123/436 |
| 4,936,277 | 6/1990 | Deutsch et al. | 123/436 |
| 4,941,445 | 7/1990 | Deutsch | 123/414 |
| 4,951,498 | 8/1990 | Kiuchi | 73/117.3 |
| 4,976,241 | 12/1990 | Ishida et al. | 123/425 |
| 5,021,960 | 6/1991 | Manaka et al. | 364/431.01 |
| 5,041,976 | 8/1991 | Marko et al. | 364/431.04 X |
| 5,191,788 | 3/1993 | Nishimura et al. | 73/117.3 |
| 5,197,325 | 3/1993 | Tamura et al. | 73/117.3 |
| 5,213,081 | 5/1993 | Fujimoto | 123/419 |
| 5,222,392 | 6/1993 | Baba et al. | 73/116 |
| 5,237,504 | 8/1993 | Holmes et al. | 364/431.08 |
| 5,239,473 | 8/1993 | Ribbens et al. | 364/431.08 |
| 5,263,453 | 11/1993 | Wakahara et al. | 123/436 |

FOREIGN PATENT DOCUMENTS

| | | |
|---|---|---|
| 306905 | 3/1989 | European Pat. Off. . |
| 3724420 | 2/1989 | Germany . |
| 63-268956 | 11/1988 | Japan . |
| 2053484 | 2/1981 | United Kingdom . |
| 2251949 | 7/1992 | United Kingdom . |

*Primary Examiner*—Collin W. Park
*Attorney, Agent, or Firm*—Mark P. Calcaterra

[57] ABSTRACT

A misfire detection apparatus and method is provided for detecting misfire in cylinders of an internal combustion engine in a motor vehicle. The method includes sensing rotation of a crankshaft and calculating a crankshaft velocity based on the sensed rotation of the crankshaft. The method also includes repeating the sensing and calculating steps a predetermined number of times to develop a measured crankshaft velocity profile. The method further includes obtaining a stored misfire velocity profile based on speed of the crankshaft, comparing the measured crankshaft velocity profile to the stored misfire crankshaft velocity profile to determine if a match exists, and counting a misfire if a match exits.

17 Claims, 7 Drawing Sheets

DUAL SENSOR MISFIRE DETECTION APPARATUS AND METHOD FOR AN INTERNAL COMBUSTION ENGINE

This is a continuation of U.S. patent application Ser. No. 07/934,066, filed Aug. 21, 1992, now abandoned.

BACKGROUND OF THE INVENTION

1. Field of the Invention

The present invention relates generally to internal combustion engines, and more particularly, to a misfire detection apparatus and method for an internal combustion engine.

2. Description of the Related Art

The Clean Air Act 1975 required motor vehicle manufacturers to reduce exhaust emissions of carbon monoxide, hydrocarbons, and oxides of nitrogen from light duty motor vehicles. To comply with the Act, most motor vehicle manufacturers have used catalytic convertors on production motor vehicles to control such exhaust emissions.

Recently, regulatory agencies have proposed that passenger, light-duty and medium-duty motor vehicles with feedback fuel control systems be equipped with a malfunction indicator light that will inform the motor vehicle operator of any malfunction of an emission-related component that interfaces with an on-board computer of the motor vehicle. It is also proposed or required that an on-board diagnostic system identify the likely area of malfunction. Proposals or requirements have set forth catalyst, misfire, evaporative purge system, secondary air system, air conditioning system refrigerant, fuel system, oxygen sensor, exhaust gas recirculation, and comprehensive component monitoring requirements.

Misfire of internal combustion engines can damage the catalyst of a catalytic convertor. With respect to misfire, the identification of the specific cylinder experiencing misfire may be required. Some regulations provide that the motor vehicle manufacturer specify a percentage of misfires out of the total number of firing events necessary for determining malfunction for: (1) the percent misfire evaluated in a fixed number of revolution increments for each engine speed and load condition which would result in catalyst damage; (2) the percent misfire evaluated in a certain number of revolution increments which would cause a durability demonstration motor vehicle to fail a Federal Test Procedure (FTP) by more than 150% of the applicable standard if the degree of misfire were present from the beginning of the test; and (3) the degree of misfire evaluated in a certain number of revolution increments which would cause a durability demonstration motor vehicle to fail an Inspection and Maintenance (IM) program tailpipe exhaust emission test.

SUMMARY OF THE INVENTION

It is, therefore, one object of the present invention to provide an apparatus and method of misfire detection for an internal combustion engine.

It is another object of the present invention to use dual sensors for misfire detection.

It is yet another object of the present invention to provide a method of misfire detection which compares a measured velocity profile to a stored misfire velocity profile to determine whether a misfire has occurred.

To achieve the foregoing objects, the present invention is a misfire detection apparatus and method for detecting misfire in cylinders of an internal combustion engine in a motor vehicle. The method includes sensing rotation of a crankshaft and calculating a crankshaft velocity based on the sensed rotation of the crankshaft. The method also includes repeating the sensing and calculating steps a predetermined number of times to develop a measured crankshaft velocity profile. The method further includes obtaining a stored misfire velocity profile based on speed of the crankshaft, comparing the measured crankshaft velocity profile to the stored misfire crankshaft velocity profile to determine if a match exists, and counting a misfire if a match exits.

One advantage of the present invention is that an apparatus and method of misfire detection is provided for an internal combustion engine. Another advantage of the present invention is that two or dual sensors are used to measure the velocity of the crankshaft and to eliminate crankshaft wheel machining tolerance errors in the measurement period. Yet another advantage of the present invention is that the use of multiple crankshaft velocity measurements per expansion cycle results in much tighter measurement than longer interval crankshaft velocity analysis.

Other objects, features and advantages of the present invention will be readily appreciated as the same becomes better understood after reading the following description taken in conjunction with the accompanying drawings.

BRIEF DESCRIPTION OF THE DRAWINGS

FIGS. 6A–6C are flowcharts illustrating the method for misfire detection of the apparatus of FIG. 1.

DESCRIPTION OF THE PREFERRED EMBODIMENT(S)

Figure 1:
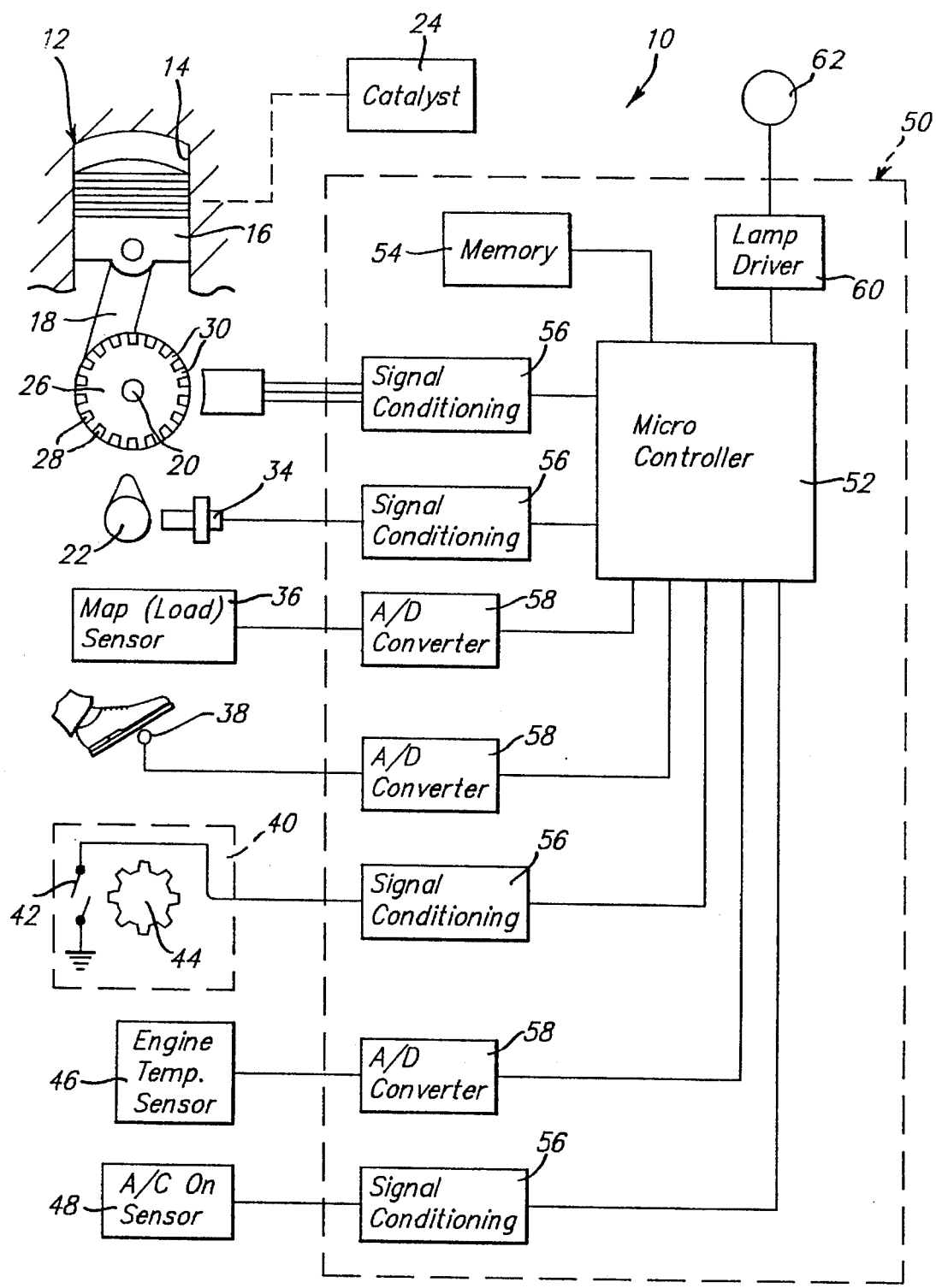
FIG. 1 is an overall block diagram illustrating the misfire detection apparatus according to the present invention.

Referring to FIG. 1, an overall block diagram illustrating the misfire detection apparatus 10 according to the present invention is shown. The apparatus 10 is used on an internal combustion engine, generally indicated at 12, of a motor vehicle (not shown). The engine 12 is partially shown in a cut-away view, illustrating one of a multiple of cylinders 14 in the engine 12. As illustrated, a piston 16 is disposed in the cylinder 14. The piston 16 is operatively connected by a connecting rod 18 to a crankshaft 20. A camshaft 22 is used to open and close at least one valve (not shown) of the cylinder 14 for various strokes of the piston 16. The piston 16 is illustrated in the expansion (power) stroke of a four stroke engine. In such a four stroke engine, the strokes include intake, compression, expansion (power), and exhaust. During the exhaust stroke, exhaust gases flow from the cylinder 14 via at least one valve and through the exhaust system (not shown). A catalyst 24 of a catalytic converter (not shown) is illustrated pictorially as part of the exhaust system. Although in the preferred embodiment the apparatus 10 is applied to a four stroke engine, the apparatus 10 can also be applied to other internal combustion engines, such as a two stroke engine. In addition, the apparatus 10 can be applied to any spark-ignited or diesel engine. It should be appreciated that a spark plug is present in the preferred embodiment, although it is not illustrated.

The apparatus 10 includes a sensor target 26 operatively connected to the crankshaft 20. The sensor target 26 has at least one, preferably a plurality of trip points, which in the preferred embodiment are slots 28 formed by teeth 30, the purpose of which are more fully described below. The apparatus 10 also includes a dual crankshaft sensor 32 in communication with the sensor target 26 and a camshaft sensor 34 in communication with the camshaft 22, both sensors of which will also be more fully described below. The apparatus 10 further includes a Manifold Absolute Pressure (MAP) or load sensor 36, throttle position sensor 38, and a vehicle speed sensor 40. The vehicle speed sensor 40 may include a reed switch 42 and wheel 44, which is a gear in the vehicle's transmission (not shown). Preferably, the vehicle speed sensor 40 is a hall effect sensor although any other similar sensor may be used. The apparatus 10 includes an engine temperature sensor 46 and air conditioner (A/C) on/off sensor 48. The outputs of the sensors 32, 34, 36, 38, 40, 46 and 48 communicate with an engine control unit, generally indicated at 50.

The engine control unit 50 includes a micro controller 52, memory 54, signal conditioning 56, and Analog to Digital (A/D) converters 58 to take signals from the various sensors described above and process them according to the misfire detection methodology described below. In the preferred embodiment, the output of the dual crankshaft sensor 32, camshaft sensor 34, vehicle speed sensor 40 and A/C on/off sensor 48 communicates with the micro controller 52, via appropriate signal conditioning 56, which is particularized to the type of sensor used. The output of the MAP sensor 36, throttle position sensor 38 and engine temperature sensor 46 communicates with the micro controller 52, via the A/D converters 58. The engine control unit 50 also includes a lamp driver 60, which takes the output of the micro controller 52 and drives an output display such as an indicator light or driver warning lamp 62. It should be appreciated that memory 54 refers to a generic memory and may comprise Random Access Memory (RAM), Read Only Memory (ROM), or another type as appropriate. It should also be appreciated that the engine control unit 50 includes timers, counters and like components for the misfire detection methodology to be described.

Figure 2:
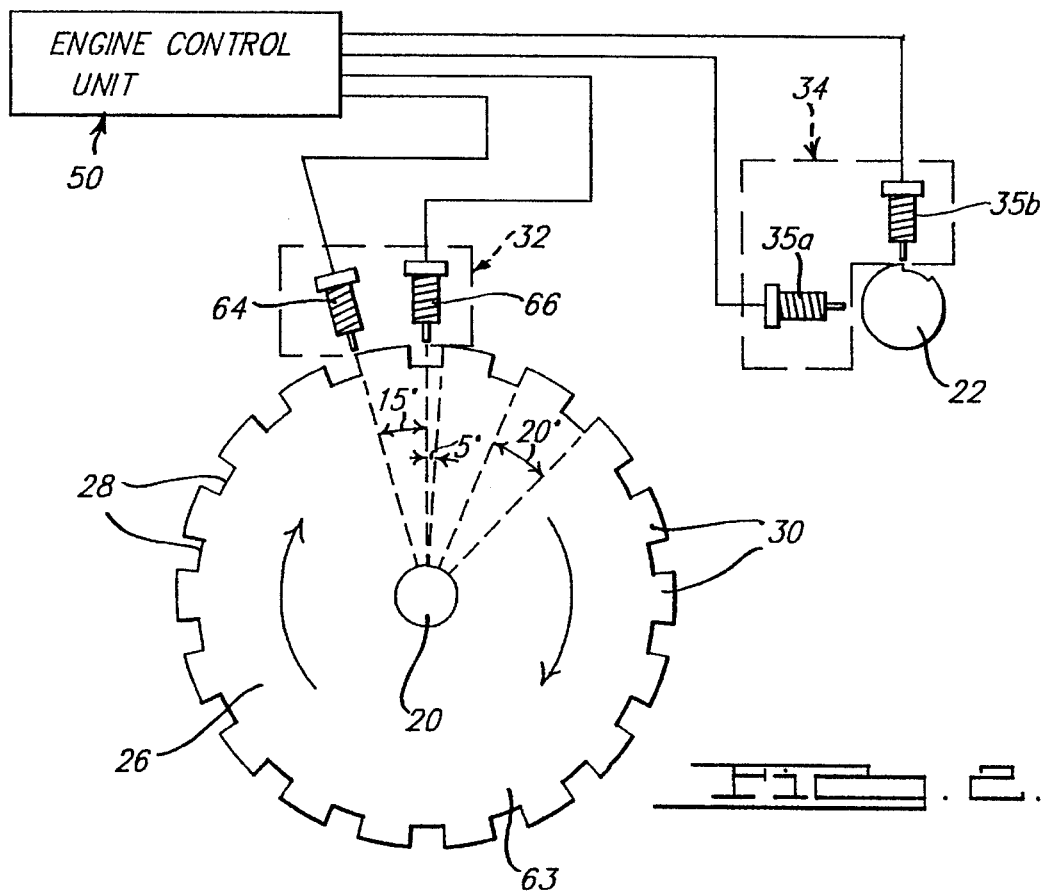
FIG. 2 is a pictorial diagram illustrating a crankshaft and camshaft in communication with the misfire detection apparatus of FIG. 1.

Referring to FIG. 2, a pictorial diagram illustrating the crankshaft 20, camshaft 22, sensor target 26, dual crankshaft sensor 32 and camshaft sensor 34 in communication with the engine control unit 50, which contains the misfire detection methodology, more fully described below. In the preferred embodiment, the sensor target 26 is formed by slots 28 which are cut into a flange 63. The flange 63 is attached to or incorporated on a pulley or wheel (not shown) such as by welding, although any means that will securely fasten the flange 63 to the wheel will suffice. The wheel is affixed to and driven by the crankshaft 20.

In the preferred embodiment, the engine 12 has six cylinders 14 oriented into two banks of three pistons 14 in a sixty degree (60°) "V" configuration, resulting in a one hundred twenty degree (120°) expansion stroke for each cylinder. 14. Since a plurality, preferably six, crankshaft velocity measurements are taken for every expansion stroke that the engine 12 makes, the slots 28 are cut every twenty degrees (20°) about the circumference of the flange 63, forming teeth 30. In the preferred embodiment, eighteen (18) slots 28 are cut and spaced equally about the circumference of the flange 63.

The dual crankshaft sensor 32 is used to measure crankshaft velocity. The dual crankshaft sensor 32 includes individual first and second sensors 64 and 66. In the preferred embodiment, the first and second sensors 64 and 66 are hall effect sensors. It should be appreciated that other sensors such as optical sensors or variable reluctance sensors may also be used in alternative embodiments of the present invention.

The first sensor 64 is located at fifteen degrees (15°) Before Top Dead Center (BTDC) position and the second sensor 66 is located at the Top Dead Center (TDC) position, both of which are mounted near the sensor target 26. The first and second sensors 64 and 66 are mounted at a fixed spacing of fifteen degrees (15°) relative to the crankshaft centerline. Thus, because the teeth 30 of the flange 63 are spaced at twenty degrees (20°), and the first and second sensors 64 and 66 are spaced at fifteen degrees (15°), a remaining five degrees (5°) is provided before a given tooth edge passes the second sensor 66 which allows time for the micro controller 52 to process and store information, before the next tooth edge passes through the second sensor 66. It should be appreciated that the circumferential length of each tooth 30 is a design choice which is a function of, among other things, the speed of the micro controller, the number of cylinders in the engine, the number of teeth in the sensor target, the types of sensors used, the method of indexing the crankshaft and camshaft, and the minimum and maximum engine speed.

In FIG. 2, the camshaft sensor 34 is used to identify specific cylinder firing. The camshaft sensor 34 includes a Low Data Rate (LDR) sensor 35a and a High Data Rate (HDR) sensor 35b. The function of the LDR sensor 35a and HDR sensor 35b will be described more fully in connection with FIG. 4. Although the preferred embodiment uses a stock distributor and algorithm to determine Top Dead Center (TDC) of the Number One cylinder, cylinder identification techniques will vary with different engines. It should be appreciated that the camshaft sensor 34 and camshaft 25 are conventional and known in the art.

Figure 3:
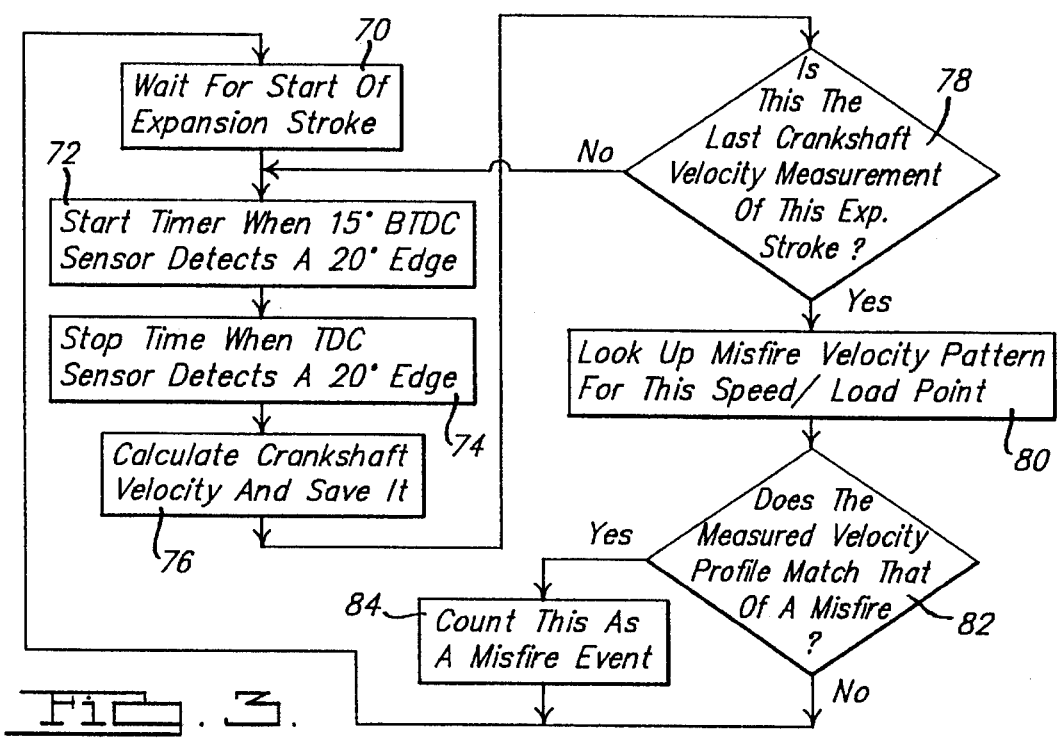
FIG. 3 is a flowchart illustrating the overall method for misfire detection of the apparatus of FIG. 1.

Referring to FIG. 3, a flowchart illustrating the overall method for misfire detection of the engine 12 is shown. The methodology begins with block 70, which requires the apparatus 10 to wait for the start of a piston expansion stroke within a known cylinder 14. Once the expansion stroke has begun as detected in block 70 for example, by looking for a synchronization pulse from the second sensor 66, the methodology advances to block 72 and starts a timer in the micro controller 52, when the first sensor 64, located at 15° BTDC position, detects a twenty degree (20°) trailing edge of a tooth 30 located on sensor target 26. The methodology advances to block 74 and stops the timer, when the second sensor 66 detects the same twenty degree (20°) trailing edge of the tooth 30 located on sensor target 26. The methodology then advances to block 76.

In block 76, the time interval on the timer which was measured in blocks 72 and 74 is used by the micro controller 52 to calculate an angular velocity (RPM) value of the tooth 30, and therefore the crankshaft 20. The result is stored by the micro controller 52 in the memory 54. Next, the methodology advances to diamond 78 and the micro controller 52 determines whether the most recent crankshaft velocity measurement is the last to occur in the expansion stroke such as by looking for a flag or at a count on a counter. If not, the methodology calls for the micro controller 52 to return to block 72 and repeat the above-described blocks 72 through 78. If the micro controller 52 determines that the most recent crankshaft velocity measurement is the last to occur in the expansion stroke, the methodology falls through to block 80. It should be appreciated that the stored crankshaft velocity values form a measured crankshaft velocity profile.

In block 80, the micro controller 52 looks to memory 54 for a stored misfire crankshaft velocity profile that corresponds to the speed/load point being experienced by the engine 12. The methodology then advances to diamond 82 and the micro controller 52 compares the measured crankshaft velocity profile with the stored misfire crankshaft velocity profile. If there is no match, the methodology calls for the micro controller 52 to return to the beginning of the methodology at block 70. If there is a match, the methodology advances to block 84 and the micro controller 52 counts the measured crankshaft velocity profile as a misfire event.

Figure 4:
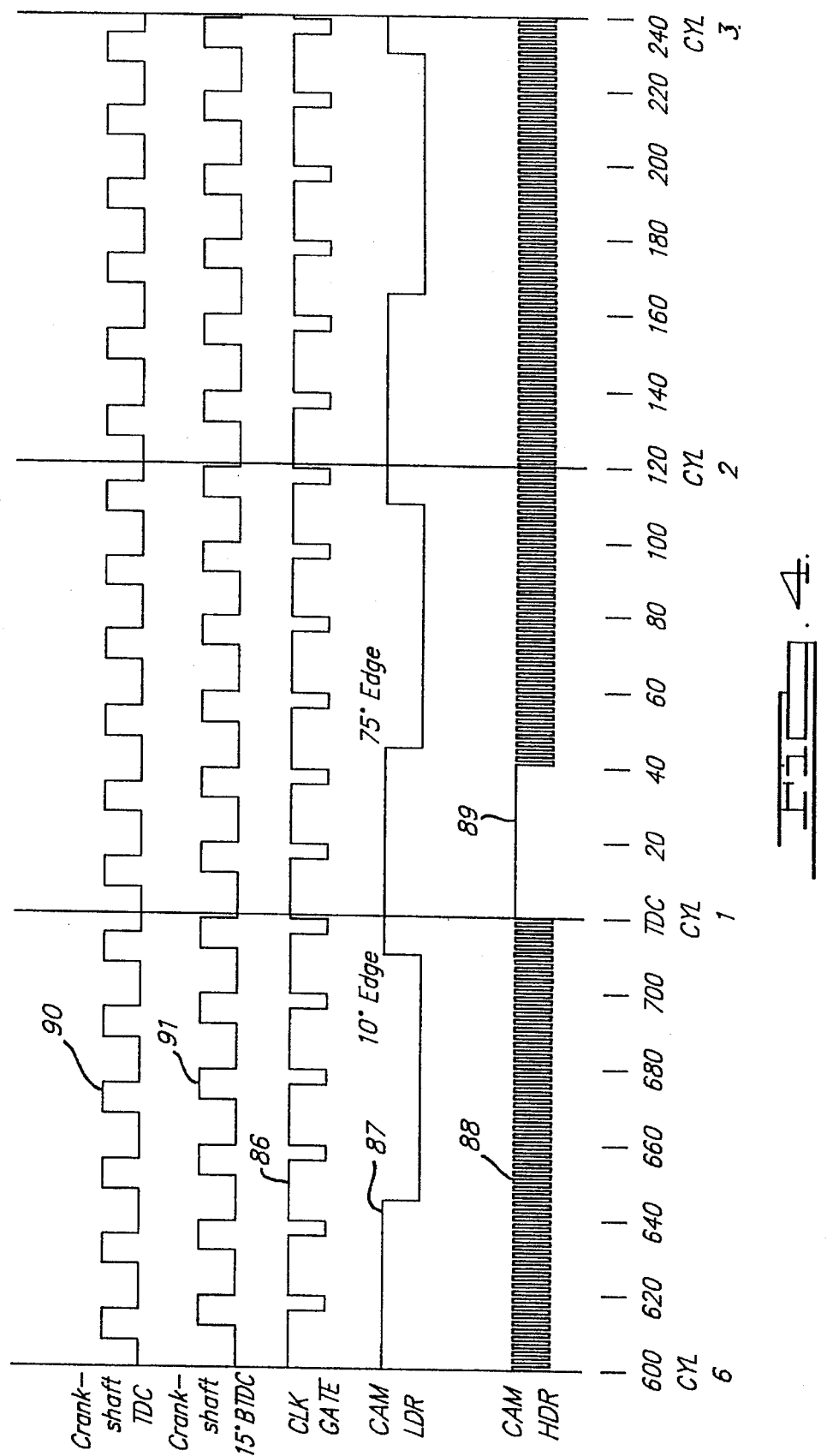
FIG. 4 illustrates sensor waveforms for the misfire detection method of FIG. 3.

When a misfire event is detected, the cylinder 14 is identified by the camshaft sensor 34, as described in conjunction with FIG. 4, and a cylinder unique misfire counter (not shown) in the micro controller 52 for that particular cylinder 14 is incremented. After a predetermined number of engine revolutions, the cylinder unique misfire counters are evaluated by the micro controller 52 to determine whether the rate of misfire could cause premature failure of the catalyst 24. If one cylinder unique misfire counter indicates failure, the cylinder number or identification is recorded by the micro controller 52 and the driver warning lamp 62 is illuminated by the lamp driver 60. If no specific cylinder can be identified as the cause of misfire, the driver warning lamp 62 is nevertheless illuminated, and a general misfire condition is recorded by the micro controller 52.

Referring to FIG. 4, sensor waveforms for the misfire detection methodology are illustrated. Basic to the waveforms is the clock gate signal CLK GATE 86. This clock gate signal is generated by the logical combination of the signal from the first and second sensors 64 and 66, which results in a pulse every twenty degrees (20°) of fifteen degrees (15°) duration. Waveforms CAM LDR 87 and CAM HDR 88 illustrate the signals generated from camshaft LDR sensor 35a and camshaft HDR sensor 35b. The signals from these sensors 35a and 35b are used to identify cylinder numbers. The camshaft 22 is indexed at predetermined intervals so that the camshaft LDR sensor 35a generates a signal every one hundred twenty degrees (120°) of camshaft rotation as illustrated in waveform CAM LDR 87. In a similar fashion, the indexing is such that the camshaft HDR sensor 35b responds to the forty-one degree (41°) blank, labeled at 89 in waveform CAM HDR 88, in the camshaft indexing.

Accordingly, a high state from the camshaft LDR sensor 35b occurs when there is no activity from the camshaft HDR sensor 35b, which indicates that cylinder 1 of the engine is at TDC. This arrangement forces the micro controller 52 to accept the identification of cylinder 1 during predetermined time periods when the high state from the camshaft LDR sensor 35a occurs when there is no activity on the camshaft HDR sensor 35b. This arrangement allows for the use of the waveform CAM HDR 88 for informational purposes while providing accuracy with the use of the waveform CAM LDR 87 to make sure that the apparatus 10 properly identifies cylinder 1 under all conditions.

The signals from the dual crankshaft sensor 32 illustrated as the Crankshaft waveform TDC 90 from the first sensor 64 and the Crankshaft waveform BTDC 91 from the second sensor 66 cycle so that a pulse is generated from each sensor every twenty degrees (20°). The shift between the Crankshaft waveforms TDC and BTDC 90 and 91 correlates with the physical offset within the dual crankshaft sensor 32 of first and second sensors 64 and 66, as shown in FIG. 2. The remainder of the twenty degree (20°) pulse width shown in the waveforms TDC and BTDC 90 and 91 consists of five degrees (5°) of offset, provided for signal processing time for the micro controller 52. The 10° and 75° edges are referenced from the beginning of cylinder #1 and cylinder #2, respectively. The 41° blank 89, from the HDR sensor 35b, will occur in the pulse window described between the 10° edge and the 75° edge in the signal generated from the LDR sensor 35a. When the 41° blank 89 occurs in the window, cylinder #1 is identified and synchronized.

Figure 5A:
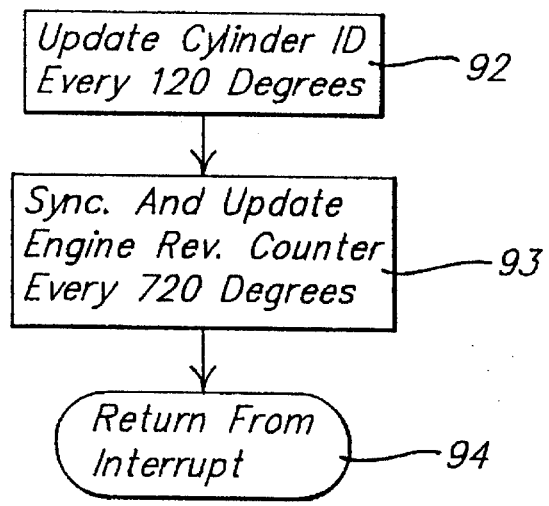
FIG. 5A and 5B are flowcharts illustrating a portion of the misfire detection method of FIG. 6A–6C.
Figure 6B:
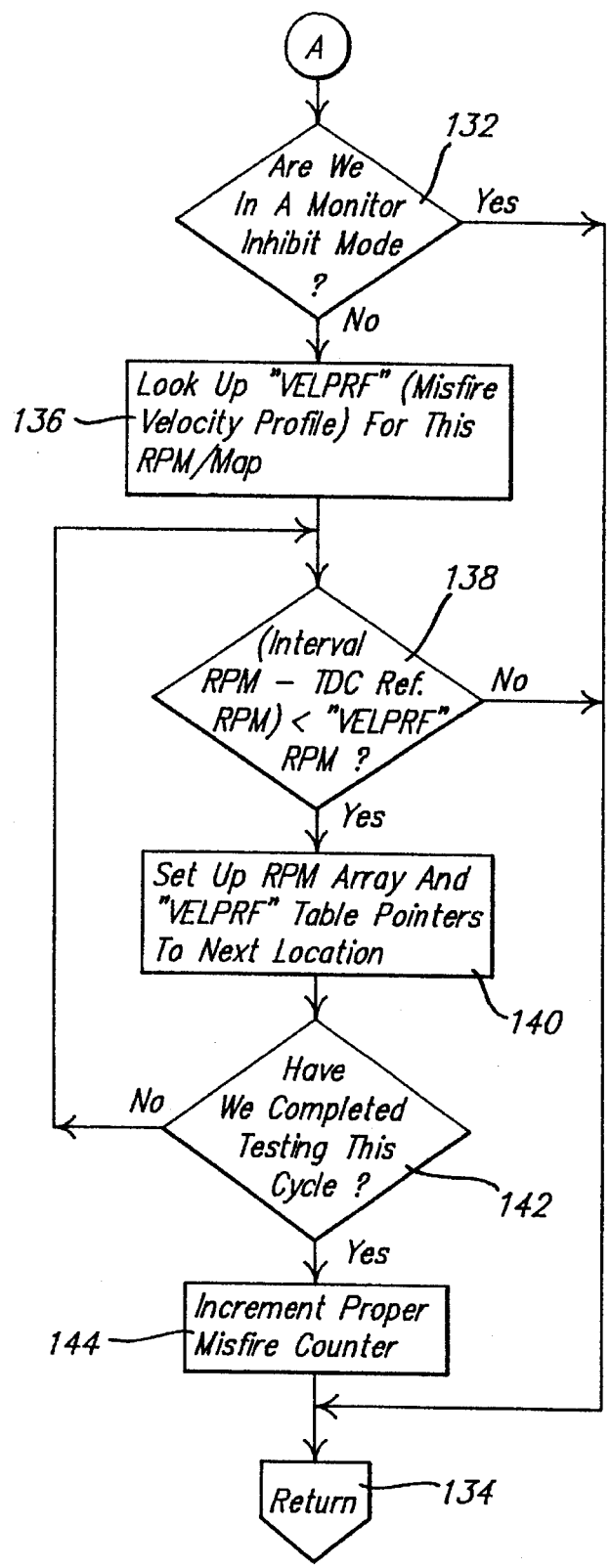
Figure 5C:
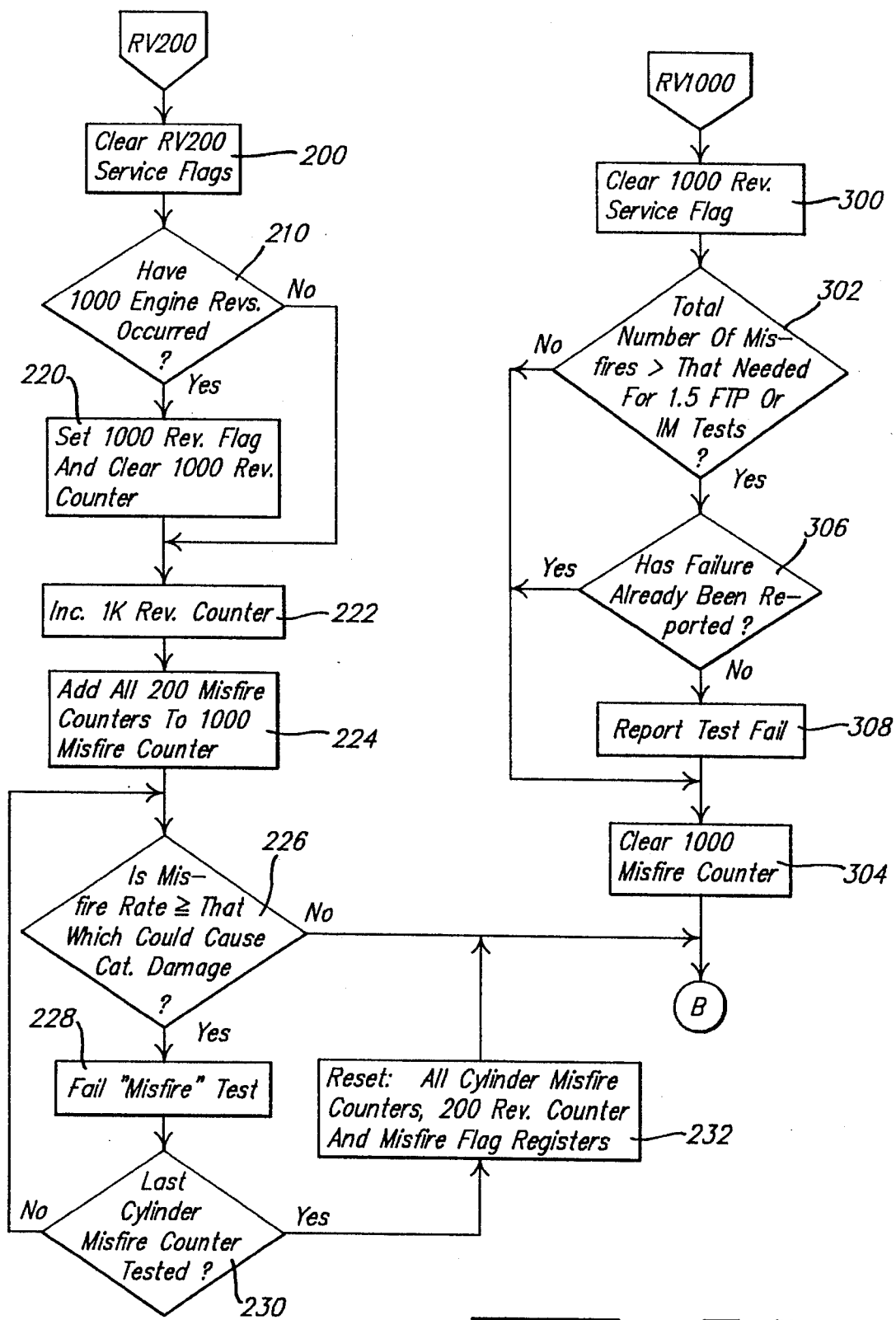

Referring now to FIG. 5A, a service interrupt for the engine 12 is illustrated. The apparatus 10 updates cylinder identification in block 92 by updating a cylinder identification counter (not shown) in the micro controller 52 every one hundred twenty degrees (120°) of crankshaft revolution. The apparatus 10 also synchronizes and updates an engine revolution counter (not shown) in the micro controller 52 every seven hundred twenty degrees (720°) of crankshaft revolution in block 93. Once the update is complete, the micro controller 52 in bubble 94 returns to the main routine to use the updated information. This is described in the discussion pertaining to FIGS. 6A and 6B.

Figure 5B:
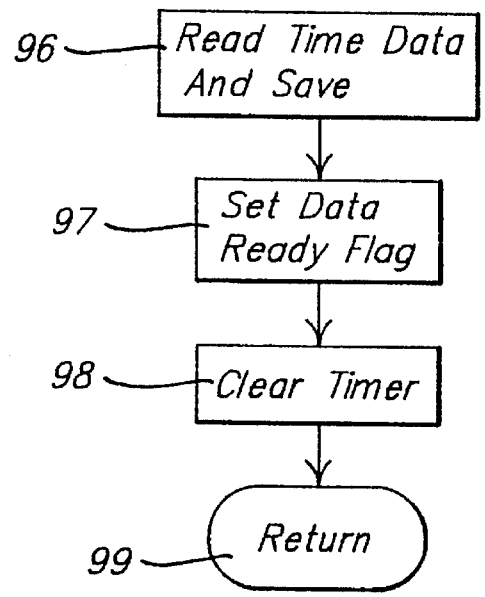
Figure 5A:
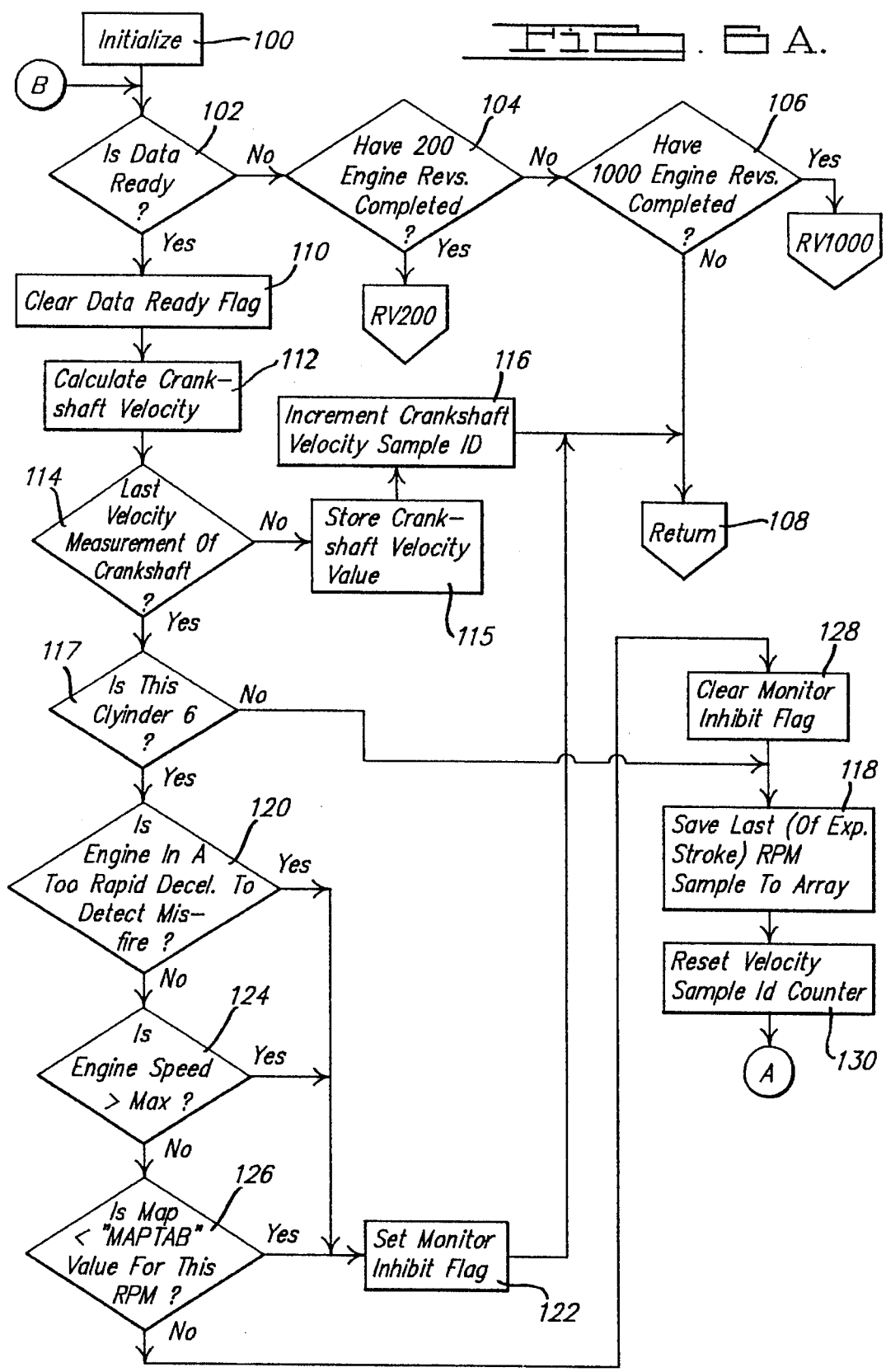

Referring to FIG. 5B, the contents of the timer in micro controller 52 is read and stored in block 96 (every negative edge of the clock gate signal CLK GATE 86). Once the contents of the timer is read and saved, the micro controller 52 sets a data ready flag in block 97 and clears the timer in block 98, before returning to the main routine from bubble 99. This is also described in the discussion pertaining to FIGS. 6A and 6B.

Referring now to FIG. 6A, the methodology is started at block 100 and initializes the apparatus 10. The methodology falls through to diamond 102, to determine if the data is ready, for example, by looking for the data ready flag in block 97. If the data is not ready, the methodology advances to diamond 104 to determine whether a predetermined number of engine revolutions such as two hundred (200) have been completed. If two hundred engine revolutions have been completed, the methodology branches to block 200, which will be described in further detail in conjunction with FIG. 6C.

Returning now to diamond 104, if two hundred (200) engine revolutions have not been completed, the methodology falls through to diamond 106 to see whether a second predetermined number of engine revolutions such as one thousand (1000) have been completed. If so, the methodology branches to block 300, which will be described in further detail in conjunction with FIG. 6C. If one thousand (1,000) engine revolutions have not been completed, the methodology falls through to block 108, to return the attention of the engine control unit 50 to tasks other than misfire detection.

Returning now to diamond 102, if the data is ready, the methodology advances to block 110, to clear the data ready flag. The methodology then advances to block 112 to calculate a crankshaft velocity value. In block 112, the engine crankshaft velocity is calculated in accordance with the following formula:

RPM=$(C_fS)/(6RC_c)$, where $C_f$=the Timer frequency in cycles/second;

S=Sensor spacing in degrees;

R=RPM resolution in RPM/bit; and $C_c$ =number of timer cycles/S.

The methodology then advances to diamond 114. In diamond 114, the engine control unit 50 determines if the last crankshaft velocity measurement of the expansion stroke is completed, for example, by looking at a count on a counter. If not completed, the methodology advances to block 115 and stores the crankshaft velocity value. The methodology then advances to block 116 and increments a crankshaft velocity sample or measurement ID. The methodology then advances to block 108 and returns.

If, in block 114, the last crankshaft velocity measurement of the expansion stroke is completed, the methodology advances to diamond 117 and determines if the monitored cylinder is a predetermined number such as six (6), for example, by looking at a cylinder identification counter. If the monitored cylinder is not number six (6), then the methodology branches to block 118, which will be fully described below.

If the monitored cylinder is number six (6) in diamond 117, the methodology advances to diamond 120, to determine if the engine is in a deceleration that would be too rapid to detect misfire, for example, by looking at a change in crankshaft velocity over a one hundred twenty degree (120°) period. If so, the methodology branches to block 122 to set a monitor inhibit flag before returning the control of the engine control unit 50 to activities other than misfire detection in block 108. This prevents the misfire detection apparatus 10 from determining misfire while the monitor inhibit flag is set.

If the engine is not in too rapid a deceleration to detect misfire in diamond 120, the methodology advances to diamond 124 to determine if the engine speed exceeds a predetermined maximum level. If the engine speed does exceed the predetermined maximum level, the methodology advances to block 122 previously described.

If the engine speed does not exceed the predetermined maximum level in diamond 124, the methodology advances to diamond 126 to determine if the current MAP value from sensor 36 is less than a stored MAP value corresponding to the current engine speed. If the current MAP value is less than the stored MAP value, the methodology advances to block 122 previously described. If not, the methodology advances to block 128, to clear the monitor inhibit flag.

Next, in block 118, the micro controller 52 saves the last crankshaft velocity measurement of the last expansion stroke. The methodology then advances to block 130 and resets a velocity measurement ID counter. The velocity measurement ID counter identifies the crankshaft angle location for each crankshaft velocity sample. Then, in diamond 132 (FIG. 6B), the micro controller 52 checks to see if the apparatus 10 is in a monitor inhibit mode by looking to see if the monitor inhibit flag is set. If the apparatus 10 is in a monitor inhibit mode, the methodology advances to block 134 and the micro controller 50 is released to perform functions other than misfire detection.

Returning to diamond 132, if the apparatus 10 is not in a monitor inhibit mode, the methodology advances to block 136 to look up a misfire crankshaft velocity profile stored in memory 54 for the current engine or crankshaft speed and MAP readings. Next, the methodology advances to diamond 138 and the difference in the interval sample crankshaft velocity measurement and the TDC reference crankshaft velocity measurement is checked to see if it is less than the misfire crankshaft velocity profile. If not, the methodology advances to block 134 to return the attention of the micro controller 52 to tasks other than misfire detection. If so, the methodology advances to block 140, where the next sample crankshaft velocity measurement is then compared to the misfire crankshaft velocity profile. The methodology then advances to diamond 142.

In diamond 142, the micro controller 52 checks to see if the testing is completed for this cycle by checking if the last crankshaft velocity measurement has been collected. If not, the methodology returns to diamond 138 to repeat the steps thereafter. If so, the methodology advances to block 144, to increment the proper cylinder unique misfire counter, before releasing the micro controller 52 in block 134 for tasks other than misfire detection. It should be appreciated that block 144 is reached when all crankshaft velocity measurements indicate misfire when compared with the stored misfire crankshaft velocity profile.

Referring now to FIG. 6C, block 200 of FIG. 6C continues from diamond 104 of FIG. 6A. In block 200, a RV 200 service flag is cleared to indicate that the two hundred (200) engine revolutions have been completed. It should be appreciated that the micro controller 52 includes a 200 engine revolution counter (not shown). Next, the methodology advances to diamond 210 and determines whether a predetermined number such as one thousand (1,000) engine revolutions have occurred or been completed by looking at a 1000 engine revolution counter (not shown) in the micro controller 52. If so, the methodology advances to block 220 and sets the 1,000 engine revolution flag and clears the 1,000 engine revolution counter. If not or block 220 has been completed, the methodology advances to block 222 to increment the 1,000 engine revolution counter. The methodology then advances to block 224 to add all cylinder unique or 200 misfire counters to the 1,000 misfire counter. The methodology then advances to diamond 226 and the cylinder unique misfire counters are checked to see if their total is greater than or equal to a predetermined rate which could cause damage of the catalyst 24. If not, the methodology advances to diamond 102, previously described. If so, the methodology advances to block 228 and indicates failure of the misfire test. From block 228, the methodology advances to diamond 230 and checks to see if the last cylinder unique misfire counter has been tested, for example by looking for a flag or a counter. If not, the methodology returns to diamond 226 previously described. If so, the methodology advances to block 232 to reset all cylinder unique misfire counters, the 200 engine revolution counter, and misfire flag registers, before returning to diamond 102 illustrated in FIG. 6A.

Referring now to block 300, the methodology clears the one thousand (1,000) engine revolution service flag before moving on to diamond 302 to determine whether the total number of misfires on the 1000 misfire counter is greater than a predetermined number of misfires needed for 1.5 FTP or IM Test. If not, the methodology branches to block 304 to clear the 1,000 misfire counter before returning to diamond 102 in FIG. 6A. If so, the methodology advances to diamond 306 and determines if a failure has already been reported, for example by looking for a flag. If so, the methodology advances to block 304 previously described. If a failure has not already been reported, the methodology advances to block 308 to report test failure, before continuing to block 304, as previously described.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An apparatus to detect misfire in individual cylinders of an internal combustion engine in a motor vehicle, comprising:

target means forming a plurality of trip points on a crankshaft of an internal combustion engine;

a pair of crankshaft sensors mounted at fixed points in proximity with said target means for sensing said trip points and rotation of the crankshaft;

at least one camshaft sensor mounted in proximity with a camshaft to identify individual cylinders of the internal combustion engine; and controller means connected to said crankshaft sensors and said at least one camshaft sensor for detecting a start of a piston expansion stroke within a known cylinder and for calculating a measured crankshaft velocity profile based on the sensed rotation of the crankshaft and for obtaining a stored predetermined misfire crankshaft velocity profile based on a speed of the crankshaft and for determining whether the measured crankshaft velocity profile matches the stored predetermined misfire crankshaft velocity profile and for counting a misfire if a match exists.

2. An apparatus as set forth in claim 1 wherein said target means comprises a target connected to the crankshaft and having a plurality of teeth formed by slots as said trip points.

3. An apparatus as set forth in claim 1 wherein said crankshaft sensors are spaced circumferentially a predetermined distance from each other.

4. An apparatus to detect misfire in individual cylinders of an internal combustion engine in a motor vehicle, comprising:

a target connected to a crankshaft of an internal combustion engine and having a plurality of teeth formed by slots to act as trip points;

first and second crankshaft sensors mounted at fixed points in proximity with said target for sensing edges of said teeth and rotation of the crankshaft;

at least one camshaft sensor mounted in proximity with a camshaft to identify individual cylinders of the internal combustion engine; and controller means connected to said crankshaft sensors and said at least one camshaft sensor for detecting a start of a piston expansion stroke within a known cylinder and for calculating a measured crankshaft velocity profile based on the sensed rotation of the crankshaft and for obtaining a stored predetermined misfire crankshaft velocity profile based on a speed of the crankshaft and for determining whether the measured crankshaft velocity profile matches the stored predetermined misfire crankshaft velocity profile and for counting a misfire if a match exists.

5. An apparatus as set forth in claim 4 wherein said target is circular and said teeth are spaced circumferentially about said target.

6. An apparatus as set forth in claim 4 wherein said first crankshaft sensor is mounted at top dead center relative to the crankshaft and said second crankshaft sensor is mounted at fifteen degrees before top dead center relative to the crankshaft.

7. An apparatus to detect misfire in individual cylinders of an internal combustion engine in a motor vehicle, comprising:

a target connected to a crankshaft of an internal combustion engine and having a plurality of teeth formed by slots to act as trip points;

first and second crankshaft sensors mounted at fixed points in proximity with said target for sensing edges of said teeth, said first crankshaft sensor being mounted at top dead center relative to the crankshaft and said second crankshaft sensor being mounted at fifteen degrees before top dead center relative to the crankshaft for sensing rotation of the crankshaft;

first and second camshaft sensors mounted in proximity with a camshaft, said first camshaft sensor creating a first camshaft signal and said second camshaft sensor creating a second camshaft signal differing from said first camshaft signal to identify individual cylinders of the internal combustion engine; and controller means connected to said first and second crankshaft sensors and said first and second camshaft sensors for detecting a start of a piston expansion stroke within a known cylinder and for calculating a measured crankshaft velocity profile based on the sensed rotation of the crankshaft and for obtaining a stored predetermined misfire crankshaft velocity profile based on speed of the crankshaft and for determining whether the measured crankshaft velocity profile matches the stored misfire crankshaft velocity profile and for counting a misfire if a match exists.

8. A method of detecting misfire in individual cylinders of an internal combustion engine in a motor vehicle, said method comprising the steps of:

waiting for start of a piston expansion stroke within a known cylinder of the internal combustion engine;

sensing rotation of a crankshaft;

calculating a crankshaft velocity based on the sensed rotation of the crankshaft;

repeating said sensing and calculating steps a predetermined number of times during the piston expansion stroke to establish a measured crankshaft velocity profile;

obtaining a stored misfire crankshaft velocity profile based on a speed/load point being experienced by the internal combustion engine;

comparing the measured crankshaft velocity profile to the stored misfire crankshaft velocity profile to determine if a match exists; and counting a misfire if a match exists.

9. A method as set forth in claim 8 including the step of waiting for a start of an expansion stroke for the cylinder before said step of sensing.

10. A method as set forth in claim 9 wherein said step of sensing comprises starting a timer when a first crankshaft sensor detects a trip point and stopping the timer when a second crankshaft sensor detects the same trip point.

11. A method as set forth in claim 9 including the step of locating a first crankshaft sensor at a top dead center position relative to the crankshaft.

12. A method as set forth in claim 11 including the step of locating a second crankshaft sensor at fifteen degrees before top dead center relative to the crankshaft.

13. A method as set forth in claim 12 including the step of forming a target on the crankshaft with teeth spaced circumferentially about every twenty degrees.

14. A method as set forth in claim 13 including the step of starting a timer when said second crankshaft sensor detects a twenty degree edge of a tooth.

15. A method as set forth in claim 14 including the step of stopping the timer when the first crankshaft sensor detects the twenty degree edge of the tooth.

16. A method as set forth in claim 15 wherein said step of calculating comprises calculating the crankshaft velocity based on the fifteen degree difference between said first and second crankshaft sensors and the time elapsed on the timer.

17. A method of detecting misfire in individual cylinders of an internal combustion engine in a motor vehicle, said method comprising the steps of:

forming a target on a crankshaft with teeth spaced circumferentially about every twenty degrees;

locating a first crankshaft sensor at a top dead center position relative to the crankshaft;

locating a second crankshaft sensor at fifteen degrees before top dead center relative to the crankshaft;

waiting for start of a piston expansion stroke within a known cylinder of the internal combustion engine;

sensing rotation of a crankshaft by starting a timer when the first crankshaft sensor detects an edge of a tooth and stopping the timer when the second crankshaft sensor detects the same edge of the tooth;

calculating a crankshaft velocity based on the fifteen degree difference between the first and second crankshaft sensors and the time elapsed on the timer;

repeating said sensing and calculating steps a predetermined number of times during the piston expansion stroke to establish a measured crankshaft velocity profile;

obtaining a stored misfire crankshaft velocity profile based on a speed/load point being experienced by the internal combustion engine;

comparing the measured crankshaft velocity profile to the stored misfire crankshaft velocity profile to determine if a match exists; and counting a misfire if a match exists.

* * * * *